(12) United States Patent
Berger et al.

(10) Patent No.: US 7,079,777 B2
(45) Date of Patent: Jul. 18, 2006

(54) OPTICAL FIBER COMMUNICATION SYSTEMS HAVING SIMULTANEOUS COMPENSATION OF POLARIZATION MODE DISPERSION AND CHROMATIC DISPERSION

(75) Inventors: Matthias Berger, Burgthann (DE); Benjamin John Eggleton, Summit, NJ (US); Herbert Haunstein, Dormitz (DE); Andreas Munk, Nuremberg (DE); Paul Stephen Westbrook, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 653 days.

(21) Appl. No.: 10/131,439

(22) Filed: Apr. 24, 2002

(65) Prior Publication Data

US 2004/0208620 A1   Oct. 21, 2004

(51) Int. Cl.
*H04B 10/00* (2006.01)
(52) U.S. Cl. .................. 398/159; 398/152; 398/158
(58) Field of Classification Search ............ 398/43, 398/65, 81, 140, 152, 158–161, 192
See application file for complete search history.

(56) References Cited

U.S. PATENT DOCUMENTS

| | | | | |
|---|---|---|---|---|
| 6,633,704 B1 * | 10/2003 | Kohnke et al. | ............... | 385/39 |
| 6,829,409 B1 * | 12/2004 | Koch et al. | .................... | 385/27 |
| 2001/0021294 A1 * | 9/2001 | Cai et al. | ...................... | 385/37 |

OTHER PUBLICATIONS

Eggleton, B.J., et al., "Electrically tunable power efficient dispersion fiber Bragg grating", IEEE Photonic Technology letters, vol. 11, No. 7, pp. 854-856 (Jul. 1999).
Heismann, F., "Automatic compensation of first—order polarization mode dispersion in a 10 Gb/s transmission system", presented at ECOC '98 , Madrid, Spain (Sep. 1998).
Takahashi, T., "Automatic compensation technique for timewise fluctuating polarisation mode dispersion in in-line amplifier systems", Electronics Letters, vol. 30, No. 4, pp. 348-349 (Feb. 17, 1994).
Lee, S., et al., "Adjustable compensation of Polarization Mode Dispersion using a High-Birefringence Nonlinearly Chirped Fiber Bragg Grating", IEEE Photonic Technology letters, vol. 11, No. 10, pp. 1277-1279 (Oct. 1999).
Pan, Z., et al., "Chirp-Free Tunable PMD Compensation using hi-bi nonlinearly chirped FBGs in a dual-pass configuration", presented at OFC, Baltimore, VA, ThH2-1 / 113-115.

(Continued)

*Primary Examiner*—Kenneth Vanderpuye
*Assistant Examiner*—David Lee

(57) ABSTRACT

In accordance with the invention, an optical fiber communication system is provided with a tunable linearly chirped Bragg grating in high birefringence fiber for reduction of polarization mode dispersion without increasing chromatic dispersion. A first embodiment using a single grating can be tuned for optimal PMD compensation, optimal chromatic compensation or optimal simultaneous compensation. Alternative embodiments using a plurality of gratings permit simultaneous compensation of both PMD and chromatic dispersion.

9 Claims, 1 Drawing Sheet

OTHER PUBLICATIONS

Taga, H., et al., "Polarisation mode Dispersion tolerance of 10 Gbit/s and RZ optical signals", Electronics Letters, vol. 34, No. 22 (Oct. 29, 1998).

Watley, D. A., et al., "Compensation of polarisation-mode dispersion exceeding one bit period using single high-birefringence fibre", Electronics Letters, vol. 35, No. 13 (Jun. 24, 1999).

Rudkevich, Eugene, et al., "Understanding polarization-mode dispersion", WCM Solutions, Opto Electronics, pp. 39-42 (Jun. 2000).

Sandel, D., et al., "Optical polarisation-mode dispersion compensation of 2.4 bit durations of differential group delay at 40 Gbit/s", Electronics Letters, vol. 35, No. 16, pp. 1365-1367 (Aug. 5, 1999).

* cited by examiner

OPTICAL FIBER COMMUNICATION SYSTEMS HAVING SIMULTANEOUS COMPENSATION OF POLARIZATION MODE DISPERSION AND CHROMATIC DISPERSION

FIELD OF THE INVENTION

This invention relates to optical fiber communication systems and, in particular, to fiber communication systems using linearly chirped fiber Bragg gratings to simultaneously compensate polarization mode dispersion and chromatic dispersion.

BACKGROUND OF THE INVENTION

Optical fiber communication systems typically comprise a modulated laser source, a length of optical transmission fiber and a receiver. Light from the laser is typically modulated into signal pulses at a high bit rate which may exceed 10 G bits/s and launched into the transmission fiber. The transmission fiber carries the signal pulses to the receiver where the signal is demodulated. Intermediate between the transmitter and the receiver, the transmission path may include optical fiber amplifiers to compensate amplitude loss, add/drop modes to permit the addition or dropping of signal channels at intermediate points, and chromatic dispersion compensators to compensate the tendency of different wavelength components of pulses to travel through the fiber at slightly different speeds.

In the absence of chromatic dispersion compensation, the different wavelength components in a transmitted pulse will gradually separate with increasing transmission distance, spreading out the pulse in time. The faster spectral components—typically the shorter wavelength components—arrive first and the slower components (usually long wavelength) arrive last. Eventually the components of a pulse will spread sufficiently that the fast components will arrive at the same as the slow components of a preceding pulse. In such case, it becomes difficult to separate pulses, and signal information may be lost. Chromatic dispersion is compensated by including in the transmission path a component, such as a length of dispersion compensating fiber, which slows the fast components and speeds up the slow components.

Another type of dispersion known as polarization mode dispersion (PMD) has only recently been recognized as a problem in contemplated high speed optical fiber systems ($\geq 10$ Gbits/s). PMD is pulse dispersion due not to the wavelength components of the transmitted light but rather to the polarization components. The light in a pulse may be thought of as partitionable into two different orthogonal polarization directions. If the pulse is passing through a symmetrical, homogeneous fiber, these two components will travel at the same speed, maintaining the compact shape of the pulse. However if the pulse encounters minor imperfections such as slight deviation of the fiber from circular cross section, bending of the fiber or even variations in temperature along the fiber length, then the speed of one polarization component will increase over the other, making the fiber birefringent. The transmitted pulse gradually spreads and distorts with eventual loss of signal information. Existing fiber lines installed as recently as the 1980's exhibit sufficient birefringence to lose signal content at transmission rates of 10 Gbits/s or more.

While a number of devices have been proposed for compensating PMD in optical fiber, none are completely satisfactory. A conventional PMD compensator comprises a polarization controller and a length of high birefringence fiber ("hi-bi" fiber). The hi-bi fiber is deliberately fabricated to exhibit two orthogonal axes for which aligned polarization components have relatively large differences in speed. The polarization controller receives polarized light from the transmission fiber and orients the polarization so that the slow polarization component is aligned with the high speed axis of the hi-bi fiber. The fast polarization component is aligned with the low speed axis. If the hi-bi fiber is of correct length, the two separated polarization components will reach the end of the hi-bi fiber at the same time, reforming a compact pulse.

A difficulty with this device is that the compensation is fixed by the hi-bi fiber, but the amount of compensation needed varies. The amount of PMD varies with wavelength, temperature and bending of the fiber. Thus needed compensation changes unpredictably with time and cannot be satisfied by a conventional fixed compensation device.

Another proposed PMD compensator uses a tunable, nonlinearly chirped Bragg grating in a length of high-birefringence fiber. The hi-bi fiber provides a different time delay for different polarization components. The nonlinear chirp of the grating provides varying amounts of time delay for different polarization components. The differential polarization time delay can be tuned by tuning the grating. See S. Lee et al., "Adjustable Compensation of Polarization Mode dispersion Using a High-Birefringence Nonlinearly Chirped Fiber Bragg Grating", II *IEEE Photonics Techn. Letters* 1277 (October 1999). The difficulty with this approach is that at the same time the nonlinearly chirped Bragg grating compensates PMD, the nonlinear chirp produces chromatic dispersion and higher order PMD. Accordingly, there is a need for tunable compensation of PMD without increasing chromatic dispersion.

SUMMARY OF THE INVENTION

In accordance with the invention, an optical fiber communication system is provided with a tunable linearly chirped Bragg grating in high birefringence fiber for reduction of polarization mode dispersion without increasing chromatic dispersion. A first embodiment using a single grating can be tuned for optimal PMD compensation, optimal chromatic compensation or optimal simultaneous compensation. Alternative embodiments using a plurality of gratings permit simultaneous compensation of both PMD and chromatic dispersion.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
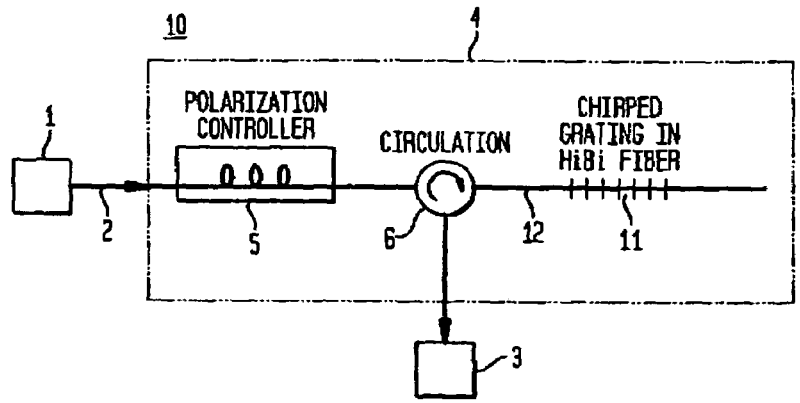
FIG. 1 schematically illustrates an optical fiber communication system compensated for PMD and chromatic dispersion in accordance with a first embodiment of the invention.

Referring to the drawings, FIG. 1 is a schematic illustration of an optical fiber communication system 10 including a linearly chirped fiber Bragg grating 11 in high birefringence fiber 12 for reducing PMD without increasing chromatic dispersion. The system 10 comprises an optical transmitter 1, such as a modulated laser, an optical fiber transmission path 2 and an optical receiver 3. The system may also optionally include one or more optical fiber amplifiers (not shown) and add/drop modules (not shown).

Disposed in the optical path between the transmitter 1 and the receiver 3 is a dispersion reduction module 4 comprising a polarization controller 5, an optical circulator 6 and a linearly chirped fiber Bragg grating 11 in high birefringence fiber 12. The polarization controller 5 is advantageously a lithium niobate waveguide comprising a plurality of adjustable waveplates. The high birefringence fiber 12 preferably has a core doped with photosensitive material such as germanosilicate, and the Bragg grating 11 is advantageously written in the core by exposure to UV radiation through a phase mask.

In operation, light pulses from transmission fiber optical path undergo chromatic and polarization mode dispersion as they travel down the path 2. When they reach polarization controller 5, their polarizations are rotated by techniques well known in the art so that the slow polarization components are aligned with the fast axis of hi-bi fiber 12 when the pulses enter fiber 12 from the circulator 6. The fast polarization components are aligned with the slow axis of fiber 12. Each component is reflected at a point in the chirped grating where the spacing $$\Lambda_g = \frac{\lambda}{2n_{\mathit{eff}}},$$

where $\lambda$ is the wavelength and $n_{\mathit{eff}}$ is the effective index for the component. Because the two components have different speeds in the hi-bi fiber, they have different effective indices $n_{\mathit{eff}}$. Thus the two components, although they have the same wavelength, will be reflected at different loci along the grating and will therefore travel different lengths within the hi-bi fiber. Quantitatively, the birefringence of the fiber results in a differential group delay (DGD)=BDλ, where B is the birefringence of the fiber, D is the dispersion of the grating and λ is the signal wavelength.

The dispersion D of the fiber grating may be fixed or tunable. If D is fixed, then the birefringence of the fiber B can be chosen to compensate for the typical level of DGD in the transmission line, i.e. B=(DGD)/Dλ, where B is the birefringence of the fiber, D is the dispersion of the grating and λ is the signal wavelength.

The controller aligns the slow polarization component of the incoming light with the fast axis and the fast component with the slow axis. The chromatic dispersion due to the chirp of the grating is the same for each component, thus providing the same chromatic dispersion for each component.

If the dispersion of the fiber grating is tunable, then the compensating DGD of the grating is also tunable. In combination with the polarization controller, the tunable grating acts as a PMD compensator with variable DGD. The grating can thus be tuned to compensate for chromatic dispersion so long as the dispersion is not varied over a large range.

Figure 2:
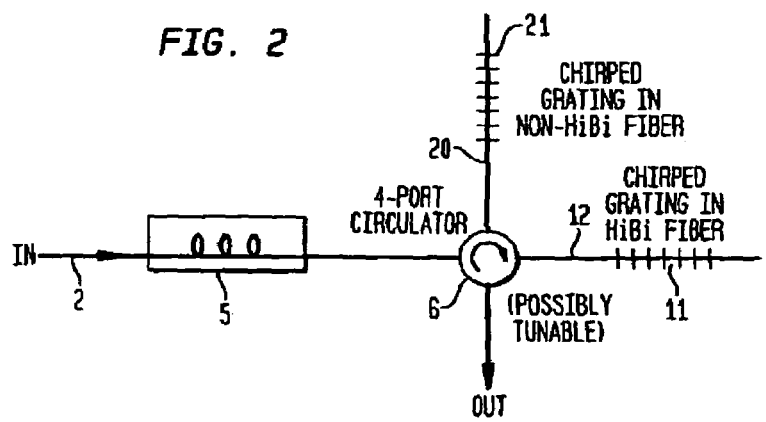
FIG. 2 illustrates an alternative dispersion compensation module useful in the communication system of FIG. 1.

FIG. 2 schematically illustrates an alternative dispersion compensation module similar to module 4 of FIG. 1 except that a second chirped grating 21 is coupled to the circulator for additional chromatic dispersion compensation. Grating 21 is written in conventional fiber 20 rather than high birefringence fiber and is preferably independently tunable. In operation, PMD is compensated in hi-bi fiber 12 as discussed above. The PMD compensated signal re-enters the circulator 6, passes into conventional fiber 20 and is reflected by chirped grating 21. Each different wavelength component of the signal will be reflected from a different locus in the chirped grating. The chirp is chosen or tuned so that slow wavelength components are reflected before the fast wavelength components. The longer paths traveled by the fast components compensate chromatic dispersion.

Figure 3:
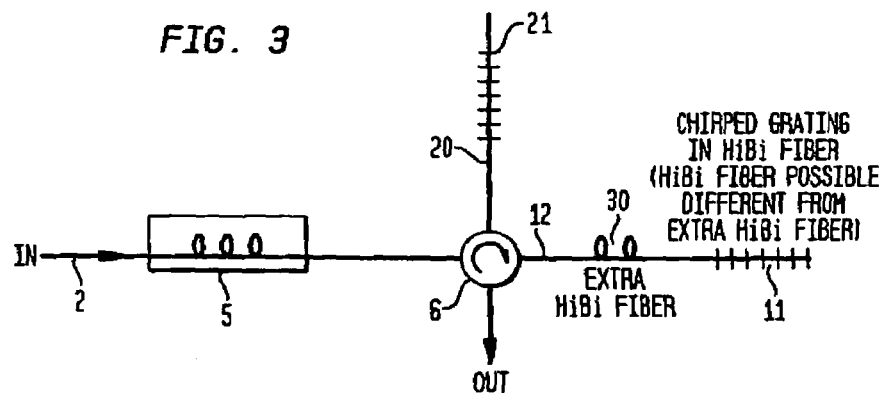
FIG. 3 illustrates another alternative dispersion compensation module.

FIG. 3 schematically illustrates a third embodiment similar to that of FIG. 2 except that an additional length of high birefringence fiber 30 is coupled to the grating 11 to provide additional polarization mode dispersion compensation.

The invention may now be more clearly understood by consideration of the following specific examples.

EXAMPLE 1

A birefringent fiber with birefringence B=1×10-5 and a tunable dispersion compensator with tunable dispersion ranging between 700 and 300 ps/nm, and the carrier wavelength being lambda=1550. The resulting tunable DGD would be between 11 ps and 5 ps.

EXAMPLE 2

The apparatus of example 1, with an additional grating in the optical path with dispersion tunable between −700 and −300 ps/nm. This grating would compensate the dispersion induced by the first grating in the hibi fiber. For example, this second grating could have its dispersion vary so as to exactly cancel the dispersion of the first grating resulting in only tunable DGD.

It is to be understood that the above-described embodiments are illustrative of only a few of the many possible specific embodiments which can represent applications of the principles of the invention. Numerous and varied minor modifications can be readily devised by those skilled in the art without departing from the spirit and scope of the invention.

What is claimed is:

1. An optical fiber communication system comprising:
   an optical transmitter;
   an optical receiver; and
   an optical oath between the transmitter and receiver, the optical path subject to unwanted polarization mode dispersion and chromatic dispersion, and disposed in the path between the transmitter and the receiver, a dispersion compensator having an input for receiving an optical signal and comprising a length of a high birefringence fiber and a linearly chirped fiber Bragg grating formed in the high birefringence fiber for compensating polarization mode dispersion without increasing chromatic dispersion, the high birefringence fiber having a birefringence, B, selected to compensate for differential group delay in the optical signal, wherein the birefringence, B, equals (DGD)/Dλ where DGD is differential group delay at the transmission input, D is the dispersion of the fixed fiber grating, and λ is the signal wavelength.

2. The system of claim 1 further comprising in the optical path one or more additional gratings in a non-birefringent fiber for compensating chromatic dispersion.

3. The system of claim 1 wherein the high birefringence fiber and linearly chirped Bragg grating are coupled to the optical path by a circulator.

4. The system of claim 1 further comprising a polarization controller in the optical path upstream of the high birefringence fiber.

5. The system of claim 1 wherein the linear chirp of the Bragg grating is tunable.

6. The system of claim 2 wherein the one or more additional gratings comprises a second chirped Bragg grating.

7. The system of claim 6 wherein the non-birefringent fiber and the second chirped Bragg grating are coupled to the optical path by a circulator.

8. An apparatus comprising:
   an input for receiving an incoming optical signal, the incoming optical signal having a slow polarization component and a fast polarization component;
   a high birefringence fiber having a linearly chirped fiber Bragg grating having a fast polarization axis and a slow polarization axis, the high birefringence fiber having a birefringence, B, selected to compensate for differential group delay in the transmission input; and
   a polarization controller for aligning the slow polarization component with the fast polarization axis and the fast polarization component with the slow polarization axis, wherein the birefringence, B, equals (DGD)/D$\lambda$ where DGD is differential group delay at the transmission input, D is the dispersion of the fixed fiber grating, and $\lambda$ is the signal wavelength.

9. The apparatus of claim 8 further comprising one or more additional gratings in a non-birefringence fiber for compensating chromatic dispersion, the non-birefringent fiber coupled to the high birefringence fiber.

* * * * *